United States Patent [19]

Bodenheimer et al.

[11] Patent Number: 5,418,675

[45] Date of Patent: * May 23, 1995

[54] PROTECTION SYSTEM FOR AC GENERATORS

[75] Inventors: Bert A. Bodenheimer, Stamford; Daniel W. Gravereaux, New Canaan; Joseph J. DeRosa, Trumbull, all of Conn.

[73] Assignee: B.A. Bodenheimer and Co., Inc., Stamford, Conn.

[*] Notice: The portion of the term of this patent subsequent to Apr. 27, 2010 has been disclaimed.

[21] Appl. No.: 81,264

[22] PCT Filed: Dec. 17, 1991

[86] PCT No.: PCT/US91/09433

§ 371 Date: Oct. 15, 1993

§ 102(e) Date: Oct. 15, 1993

[87] PCT Pub. No.: WO92/11677

PCT Pub. Date: Jul. 9, 1992

[51] Int. Cl.[6] .............................................. H02H 7/06
[52] U.S. Cl. ........................................ 361/20; 361/29; 361/87
[58] Field of Search ............... 361/20, 23, 29, 31, 361/78, 85, 87, 93, 94; 322/10–16, 23, 27

[56] References Cited

U.S. PATENT DOCUMENTS

| | | | |
|---|---|---|---|
| 4,155,107 | 5/1979 | Osborne et al. | 361/20 |
| 4,406,984 | 9/1983 | Karlicek | 361/87 |
| 5,045,778 | 9/1991 | Thibodeau et al. | 361/29 |
| 5,206,776 | 4/1993 | Bodenheimer et al. | 361/20 |

*Primary Examiner*—A. D. Pellinen
*Assistant Examiner*—Ronald W. Leja
*Attorney, Agent, or Firm*—David P. Gordon

[57] ABSTRACT

A circuit for protecting the ac generator and/or load of a diesel-engine generator set is provided. Included is a circuit for measuring indications of the current in each phase of the ac generator, and a switching circuit for protecting the ac generator if the current in any phase is greater than a predetermined current for a predetermined length of time (overcurrent), or if the current in any phase is less than a predetermined function of the currents in each of the phases for the predetermined length of time (imbalance). The circuit which protects the ac generator preferably short circuits the field winding of the ac generator and thereby turns off the ac generator, and/or closes a fuel valve to effectively turn off the engine should the current imbalance or overcurrent be sensed. In conjunction with the protection circuit, a switch interlock and/or circuit breaker arrangement for shock protection is provided.

6 Claims, 7 Drawing Sheets

PROTECTION SYSTEM FOR AC GENERATORS

BACKGROUND OF THE INVENTION

This invention generally relates to protection systems for alternating current (ac) generators. More particularly, this invention relates to systems for protecting ac generators of diesel-engine generator sets against damage from overload.

The protection of ac generators of diesel-engine generator sets against damage from overload is presently accomplished by one of several arrangements. In a first arrangement, a measurement of the ac generator field current is used to shut down the excitation field of the ac generator when the field current increases above a predetermined value. In a second arrangement, a circuit breaker is provided in the output circuit. Both arrangements have proved unsatisfactory for several reasons. Where the field current is measured, the currents being measured are typically small; e.g. two amperes. Depending on the output voltage and the load, normal field current variation can be larger than the value to which the detector is set to shut down excitation. Thus, the diesel-engine generator may be inadvertently shut down during normal operation; an undesired situation.

When a circuit breaker in the output circuit is used, the current in the load is measured by a thermal or magnetic element, and the circuit breaker is tripped (i.e. the circuit is opened) when the load current exceeds a given value for a certain length of time. When used in compressor motor starting, as is the case with transport refrigeration units, the circuit breaker must not trip immediately as the motor starting ("inrush") current must be accommodated. Typically the inrush current is about five to six times the normal load current, and must be accommodated for a period of between one to five seconds. Because of the materials and components used in typical circuit breakers designed for motor starting, a range of circuit breaker trip times is expected for a given overload current. For example, as seen in the prior art FIG. 1, the circuit breaker trip time for a 700% current overload is typically one to four seconds. In diesel-engine generator sets for 460 V service for refrigerated containers, the typical circuit breaker rating is thirty amperes, and a 700% overload represents two hundred ten amperes. When such a circuit breaker is used with a power grid network of a public utility, the grid is able to supply well in excess of two hundred ten amperes. The circuit breaker can therefore be expected to open the circuit within the one to four seconds in the event of a short circuit in such situations. However, with small generators, such as are used in diesel-engine generator sets, the maximum current that can be delivered by the ac generator is about one hundred fifty amperes, or 500% overload. In such situations, as seen in FIG. 1, the trip time of the circuit breaker can be as long as approximately eight seconds at which time the ac generator may already be damaged. Moreover, the circuit breakers of the art will not protect the ac generator in time in the case of current imbalance; i.e. where one of the conductors of a three phase circuit is not drawing current (single phase condition) and the unit is running at only 500% overload or less.

In light of the shortcomings of the field current measurement and the circuit breaker in the output circuit arrangements, it appears that the only reliable manner of protecting the ac generator is to measure the load current directly. Circuit breakers which measure the load current and cause the circuit breaker to trip with an auxiliary device are known in the art. They are not suitable for application to diesel-engine generator set protection, however, because they do not have adequate delay time to accommodate motor starting currents.

SUMMARY OF THE INVENTION

It is therefore an object of the invention to provide protection circuits for ac generators which measure load currents but which permit inrush currents.

It is another object of the invention to provide a protection circuit for an ac diesel-engine driven generator which measures load currents, permits inrush currents, and which shuts down the field excitation of the alternating current generator in the case of an overload and/or current imbalance.

It is a further object of the invention to provide a protection system for an ac diesel-engine generator which turns off engine fuel and/or shuts down the field excitation of the ac generator and/or opens the load circuit in the case of current imbalance or non-start-up overload.

It is even another object of the invention to provide a protection system for an ac diesel-engine generator in conjunction with an interlock arrangement such that the field windings of the generator are de-energized or the load circuit is opened during connector plug insertion into an output load socket.

In accord with the objects of the invention, a protection circuit for protecting the ac generator of a diesel-engine generator set is provided and comprises: a circuit for measuring indications of the current in each phase of the ac generator; and a circuit for protecting the ac generator if the current in any phase is greater than a predetermined current for a predetermined length of time, or if the current in any phase is less than a predetermined function of the currents in each of the phases for the predetermined length of time. Preferably, for diesel-engine generator sets which generate three phase 460 V continuously at up to thirty amperes, the predetermined overcurrent for any phase of the ac generator is thirty-five amperes, and the predetermined length of time (to permit inrush currents) is five seconds (although anywhere between three to eight seconds is preferred). Also, preferably the current in any phase should not be less than fifty percent of the average currents in the three phases. The circuit which protects the ac generator preferably short circuits the field winding of the ac generator which reduces the output voltage of the ac generator to nearly zero, and/or closes a fuel valve to effectively turn off the engine should the current imbalance or overcurrent be sensed for the five seconds. If desired, the protection circuit may also open the circuit between the generator and the load, thereby acting as a circuit breaker for the load. In conjunction with the circuit for protecting the ac generator, a switch interlock arrangement is provided to protect an operator against shocks during connector plug insertion.

Additional objects and advantages of the invention will become evident to those skilled in the art upon reference to the detailed description taken in conjunction with the provided figures.

BRIEF DESCRIPTION OF THE DRAWINGS

FIG. 6 shows the relationship between FIGS. 6a and 6b.

DETAILED DESCRIPTION OF THE PREFERRED EMBODIMENT

Figure 1:
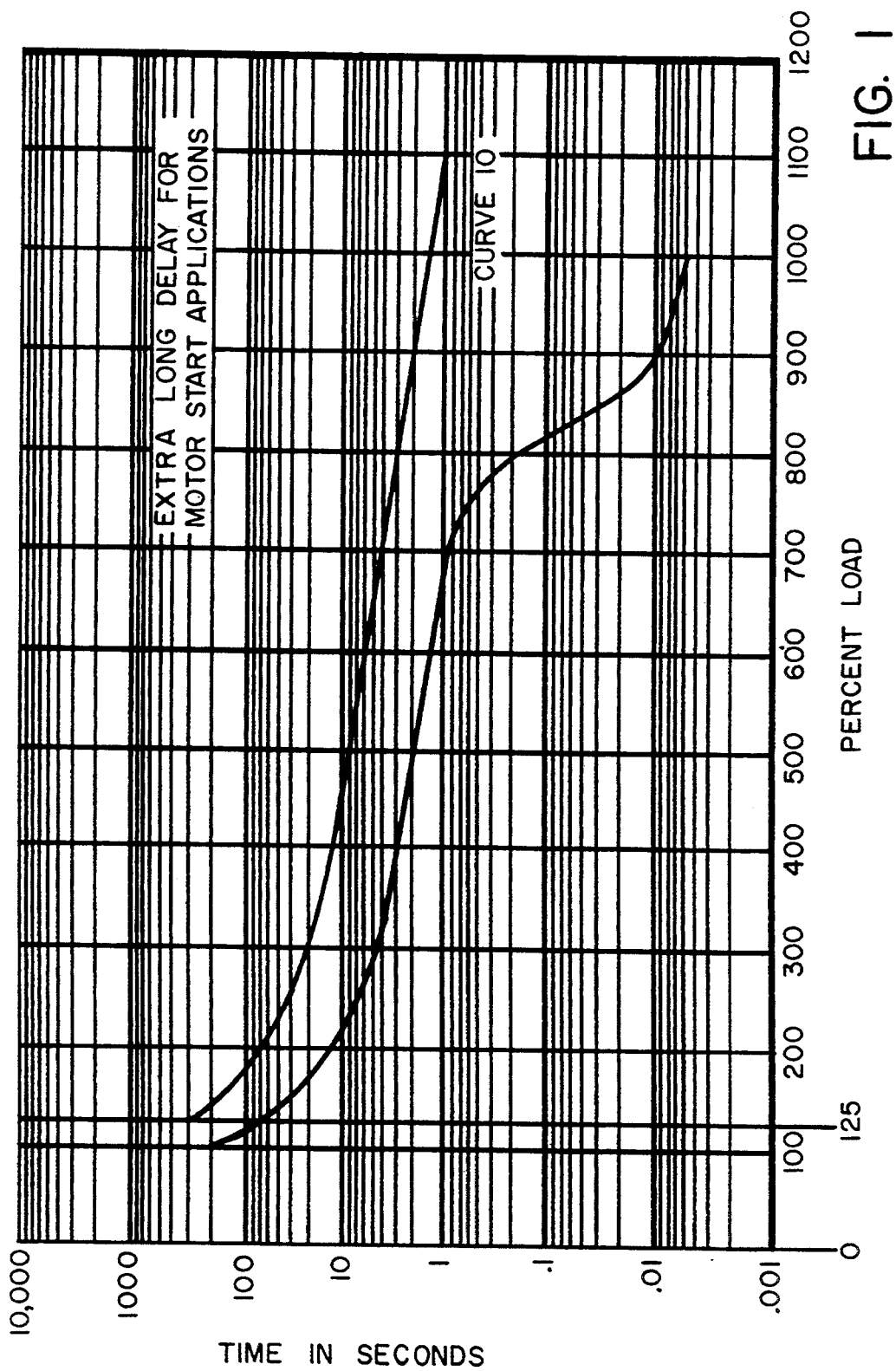
FIG. 1 is a prior art graph of the time versus load characteristics of a prior art circuit breaker which permits high inrush currents.

Diesel-engine generator sets for trucks, and particularly for refrigerated containers are well known in the trucking industry. As seen in broad concept of FIG. 2, a diesel generator set 12 has an engine 20, a fuel tank 30, a solenoid operated fuel valve 35, a standard three phase alternating current generator 40 with a rotor (not shown), a stator (not shown) and an exciter field winding 42, and a sensing or protection circuit 60. The engine 20 runs by fuel which is received from the fuel tank 30 via the solenoid operated fuel valve 35. In turn, the engine 20 rotates the rotor of the ac generator 40. (The exciter field is initially energized by residual magnetism and is sustained during load current drain from rectified outputs.) The generator generates power of alternating polarity on load lines 52a, 52b, and 52c which are coupled to the load 50. The protection circuit 60 monitors the current on load lines 52a, 52b, and 52c, and as described in detail hereinafter, either activates switch 70a which uses line 80a to short the field windings 43 of the ac generator 40, and/or activates switch 70b which de-energizes line 80b which must be energized for the fuel valve solenoid 35 to pass fuel. In accord with a preferred aspect of the invention, load lines 52a, 52b, and 52c terminate in a socket 85 which uses an interlock system 90. The interlock removes the generator output power from the socket only during plug insertion or removal by shorting out the field winding 80a by temporary activation of the switch 70a.

Because of the widespread use of diesel-engine generators, standards are in the process of being promulgated. Typically, it is desirable to provide diesel-engine generators which generate a three phase 460V signal at up to thirty amperes. During start-up of a load, an inrush current exceeding thirty amperes is permissible.

With the suggested standards, and with a typical ac generator of the art, it is has been determined by the inventors that for typical refrigerated container loads, the current from the ac generator 40 should not exceed thirty-five amperes for more than five seconds; otherwise, the ac generator and/or the refrigerator may be damaged. Also, it has been determined by the inventors that, over five seconds, the current in any of the three phases should not be less than fifty percent of the average current in the three phases. Such an imbalance could likewise cause damage to the ac generator and/or refrigerator.

Figure 3A:
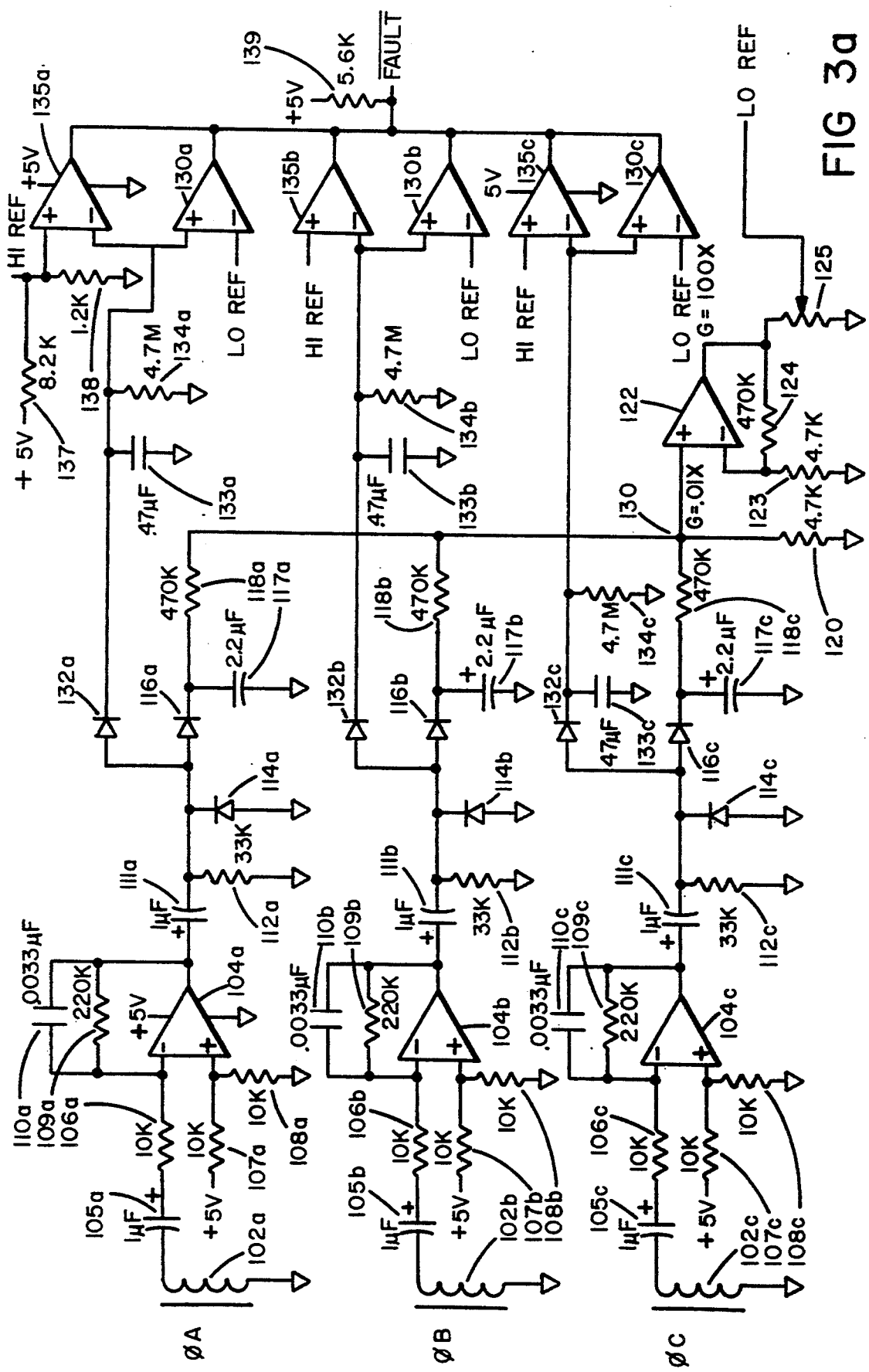
FIGS. 3a and 3b together constitute a circuit diagram of a first embodiment of the protection system circuitry and switch interlock of the invention.
Figures 3B, 3C:
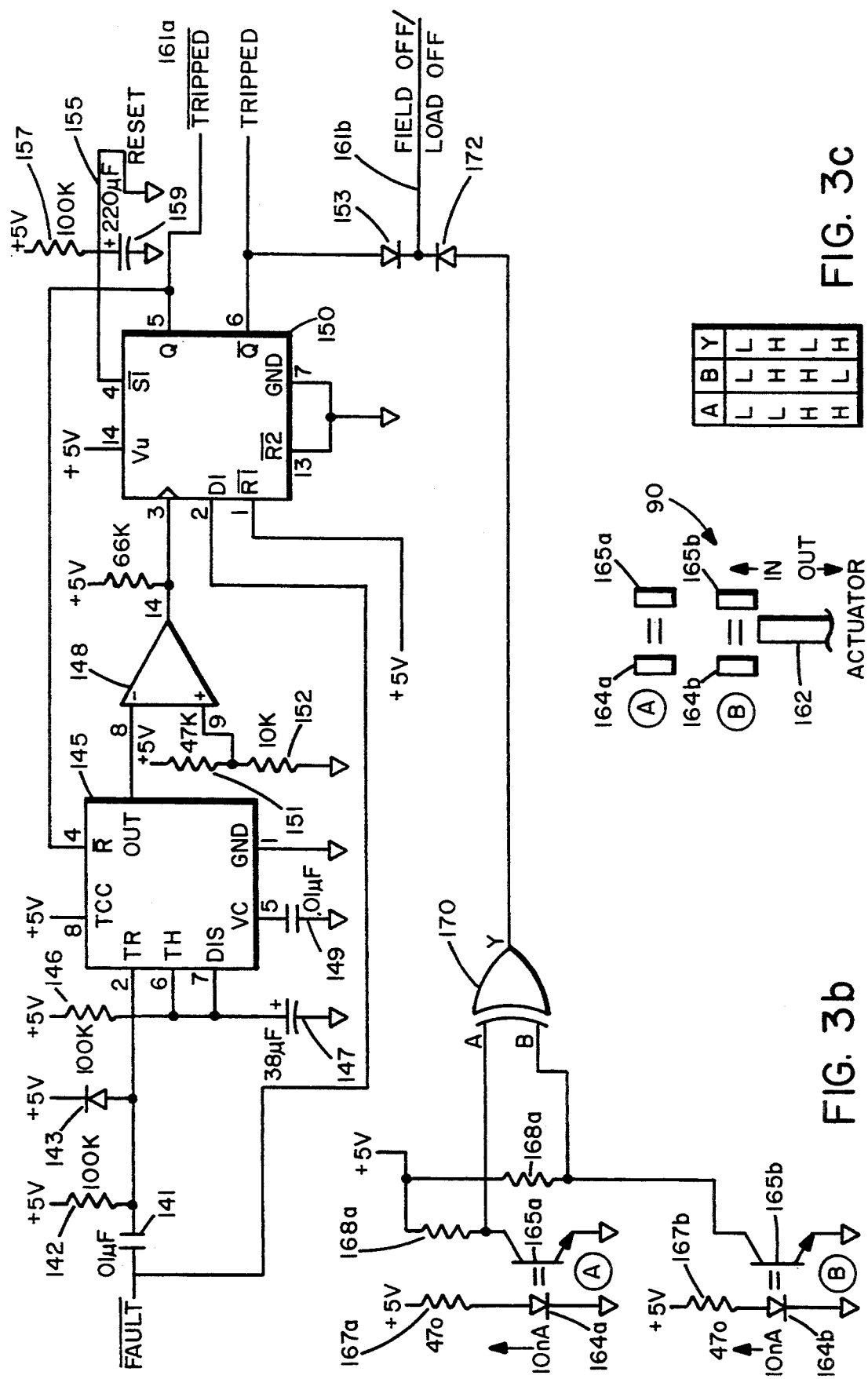
FIG. 3c is a schematic diagram of the switch interlock of the invention.

In order to prevent a prolonged imbalance or overcurrent condition, a protection circuit 60 as seen in FIGS. 3a and 3b is provided. In order to sense the current in each of the load carrying conductors (lines) 52a, 52b, ,52c, three transformer couplings 102a, 102b, and 102c are used, with the voltage induced in each coupling by the load carrying conductor being proportional to the current in the respective phase. The transformer couplings are iron cores around which a coil is wound and through which the load carrying conductors run. For each transformer coupling (for purposes of brevity only the circuit coupled to transformer coupling 102a being described) one end of the coil is coupled to ground while the other end is coupled to the negative input of an amplifier 104a via a one microfarad capacitor 105a and a 10k ohm input resistor 106a. The positive input of the amplifier 104a is provided with a voltage of 2.5 volts, as 10k ohm resistors 107a and 108a are used in a voltage divider arrangement with resistor 107a coupled to a positive 5 V voltage source, and resistor 108a coupled to ground. The output of amplifier 104a is coupled to the negative input via a 220k ohm resistor 109a coupled in parallel with a 0.0033 microfarad capacitor 110. So arranged, the amplifier has a gain of twenty-two at low frequencies and provides a spiked 60 cycle signal. If higher gain is desired (e.g. where fewer windings are used in the transformer couplings), a larger feedback resistor 109a can be used.

The output of amplifier 104a is also fed to a high pass filter comprised of the 1 microfarad capacitor 111a and the 33k ohm resistor 112a which effectively blocks the 2.5 V d.c. signal at the output of the amplifier and passes the sixty cycle ac signal. The 33k ohm resistor 112a is coupled to ground in parallel with a diode 114a. The diode 114a functions as a halfwave rectifier by eliminating the negative voltage spikes output by the amplifier 104a. The positive voltage spikes are fed in parallel to two circuits: the imbalance circuit; and the overcurrent circuit.

The imbalance circuit includes diodes 116, capacitors 117, voltage divider resistors 118 and 120, a buffer amplifier 122, amplification resistors 123 and 124, a voltage divider or potentiometer 125, comparators 130, and circuitry which is also part of the overcurrent circuit including diodes 132, capacitors 133, and resistors 134. Capacitors 117 are part of the peak rectifiers which convert the spiked signal into a direct current (dc) signal. In that regard, diodes 116 are provided to prevent discharging of the capacitors through the 33k ohm resistors 112. Rather, discharging is achieved through the 470k ohm voltage divider resistors 118, and the 4.7k ohm voltage divider resistor 120 which is coupled to ground. Effectively, those resistors divide the peak voltages by a value of one hundred; which division is provided to prevent the capacitors 117 from charging each other. The so divided peak voltages are summed together at node 130, and are fed to the positive input of buffer amplifier 122. The negative input of buffer amplifier 122 is coupled to ground via 4.7k ohm resistor 123. Also coupled to the negative input of buffer amplifier 122, and bridging the buffer amplifier output to the negative input is a 470k ohm amplification resistor 124. Resistors 122 and 123 cause buffer amplifier 122 to restore the summed peak rectifier signals by amplifying the sum (which had been divided by one hundred) by a factor of one hundred. The restored sum signal is then divided by six by the voltage divider or potentiometer 125 to effectively provide a signal equal to:

$$(I_A+I_B+I_C)/6 = 50\% \ (I_A+I_B+I_C)/3$$

or 50% of the average of the currents in the three phases, where $I_A$, $I_B$, and $I_C$ are the currents in each of the three phases. This signal is referred to as the low reference or "Lo Ref" signal. In accord with one preferred aspect of the invention as described in more detail hereinafter, the current in each phase is compared to the Lo Ref signal by comparators 130 to determine imbalance (i.e. current imbalance).

The overcurrent circuit of the invention includes diodes 132, 0.47 microfarad capacitors 133, 4.7M ohm resistors 134, voltage comparators 135, and voltage divider resistors 137 and 138 which provide a high reference voltage ("Hi Ref") to the voltage comparators 135. The capacitors 133 of the overcurrent circuit, which are coupled between diodes 132 and ground, act in a similar capacity to the capacitors 117 of the imbalance circuit by charging up and providing a dc signal indicative of the current in the phase. The resistors 134 which are also coupled between diodes 132 and ground, in conjunction with the capacitors 133, provide an RC time constant. The voltage on capacitors 133 therefore decreases over time in accord with the RC time constant, unless recharged by another spike. The diodes 132 prevent discharge of the capacitors through the 33k ohm resistors 112. The voltages maintained on the capacitors 133, which are indicative of the currents in the respective phase, are fed to the negative inputs of the voltage comparators 135, as well as to the positive inputs of imbalance comparators 130.

Looking first at voltage comparators 135, the positive inputs of the voltage comparators 135 are set to voltages corresponding to thirty-five amperes in the phase. For example, with a transformer coupling having a sixteen laminate O core surrounding the conductor with twenty turns for the secondary winding, 0.64 V at the negative input of a comparator 135 corresponds to thirty-five amperes in the corresponding phase. Hence, given a five volt source derived from the motor generator battery as described hereinafter with reference to FIG. 4, voltage divider resistors 137 are set to be 8.2k ohm resistors, and voltage divider resistors 138 are set to be 1.2k ohm resistors. The resulting voltage (Hi Ref) supplied to the positive inputs of comparators 135 is 0.64 V = 5 V [1.2/(1.2+8.2)]. If the voltage at the negative input of a comparator 135 exceeds 0.64 volts, the output of the comparator 135 is pulled low, indicating that more than thirty-five amperes have been sensed in a load carrying conductor (phase). Because the output of comparator 135 is normally kept high by a 5.6k ohm resistor 139 which is coupled between the outputs of comparators 135 and a high voltage, the low voltage output from comparator 135 provides an error signal (FAULT—active low) which is processed as hereinafter described.

As aforementioned, the voltages maintained on capacitors 133 are also fed to the positive inputs of imbalance comparators 130 which receive the Lo Ref signal at their negative inputs. If the voltage of any phase is less than the voltage of the Lo Ref signal (i.e. $I_x < 50\%$ $(I_A+I_B+I_C)/3$), an imbalance is detected, and the output of the comparator 130 is pulled low. Thus, imbalances due to current imbalance are detected and provide the same FAULT signal which is provided when overcurrent conditions are sensed.

Turning to FIG. 3b, the circuitry which processes the active low FAULT signal is seen. The active low FAULT signal is fed via capacitor 141 to the trigger input of a timer block 145. The 100k ohm resistor 142 which is coupled between capacitor 141 and the high voltage rail, in conjunction with capacitor 141 and with diode 143, provides a voltage pull-up to prevent continuous trigger signals from being applied to the trigger input of the timer block 145 unless continuous FAULT signals are being received. The low FAULT signal received at the trigger input of the timer block causes the timer block 145 to start counting for an amount of time dictated by the inputs to inputs 6 and 7 of the timer block 145. In particular, by providing an 100k ohm resistor 146 and a 33 microfarad capacitor 147 in series between a 5 V source and ground, and by providing five volts to the Vcc input of the timer block and a 0.01 microfarad capacitor 149 between ground and the Vc input of the timer block, the timer block 145 is set to provide a high output for five seconds. The high output is fed to the negative input of comparator 148. The positive input of comparator 148 is provided with approximately 0.9 V due to the use of a 47Kohm voltage divider resistor 151 and a 10k ohm voltage divider resistor 152. With a relatively high voltage at the negative input of comparator 148, and a relatively low voltage at the positive input, comparator 148 provides a low output for five seconds.

The low output from comparator 148 which is triggered by the error signal from the overcurrent and/or imbalance comparators of FIG. 3a, is fed to the clock input of DQ flip-flop 150 and acts as a five second clock pulse. The data input into flip-flop 150 is taken directly from the error signal (FAULT). If, after five seconds, an error signal (low voltage signal) is not being generated by the overcurrent and/or imbalance comparators, a high signal is clocked over from the D input over to the Q output at the end (i.e. the rising edge) of the five second clock pulse, and no error condition is generated (i.e. no switches are tripped). Such a situation is indicative of inrush currents typical upon start-up, or a transient. Where there is no error, and the Q output of flip-flop 150 is high, the high output is fed back to the reset input of the timer block 145, and the timer block 145 is permitted to function normally (e.g. look for another trigger). On the other hand, if an error signal is still being generated after five seconds, an undesirable overcurrent or imbalance is indicated, and a low voltage signal will be clocked over to the Q output of the DQ flip-flop at the end of the five second clock pulse. As a result, the timer is turned off so that an automatic reset of the flip-flop 150 is not possible. Also, as the Q output of the DQ flip-flop is preferably coupled to a solid-state switch 70b via line 161a, a low Q output causes switch 70b to de-energize the fuel valve solenoid. At the same time as the Q output of the DQ flip-flop goes low, the not Q output goes high. This high signal is fed via diode 153 and line 161b preferably to solid-state switch 70a which short circuits the field windings of the ac generator. With the field windings of the ac generator short circuited, and the fuel valve solenoid de-energized, the engine and the ac generator turn off, thereby protecting the ac generator, engine, and load.

Because overcurrent and current imbalance are serious conditions, it is desirable that the entire system be shut down upon overcurrent or current imbalance sensing, and that the system be restarted only by manual intervention. Thus, reset circuitry is provided including a reset switch 155, a 100k ohm resistor and a 220 microfarad capacitor 159. The resistor 157 and capacitor 159 are coupled in series between a 5 V source and ground, with the reset input of the DQ flip-flop coupled to the common node of the resistor 157 and capacitor 159. The reset input of the DQ flip-flop is also coupled to a first input of the reset switch 155. Normally, the reset switch 155 is not closed, and the voltage applied to the reset input of the DQ flip-flop 150 is a high voltage dictated by the resistor 157 and the capacitor 159. However, when the reset switch 155 is closed, the first input of the reset switch is coupled to the second (ground) input of the reset switch, and a low voltage is applied to the reset input of the DQ flip-flop 150. As a result, DQ flip-flop is reset with its Q output high and its not Q output low. The Q output is fed back to the timer reset input which permits the timer 145 to start functioning normally again.

According to another preferred aspect of the invention, and as seen in FIGS. 3b and 3c, a switch interlock arrangement 90 is provided. As is hereinafter described, the switch interlock 90 effectively short circuits the field winding of the ac generator during plug insertion of the load into a socket of the ac generator so as to protect an operator against shocks.

As seen in FIGS. 3b and 3c, according to a preferred embodiment, the switch interlock 90 includes an actuator 162 such as a light blocking rod, two light emitting diodes 164a and 164b, two photoelectric transistors 165a and 165b, and a housing (not shown) and mechanical interlock system (not shown) mounted in the socket. The light emitting diodes 164a and 164b are coupled between ground and 470 ohm resistors 167a and 167b. Resistors 167a and 167b are coupled to a 5 V source. The photoelectric transistors 165a and 165b have their emitters coupled to ground, and their collectors respectively coupled to resistors 168a and 168b, and to the A and B inputs of XOR gate 170. When the actuator is not engaged (i.e. the load is not plugged in), the light emitting diodes 164a and 164b emit light which is picked up by transistors 165a and 165b. With light at their gates, the transistors 165a and 165b turn on, and pull the voltage at their collectors low. The low voltages are fed to the XOR gate which provides a low output. The low output is fed via diode 172 to switch 70a which does not cause any interruption (i.e. the field windings are not shorted). However, when an operator commences pushing the plug into the socket, the actuator 162 blocks the light from LED 164b from reaching the photoelectric transistor 165b. As a result, transistor 165b turns off, and the voltage at the collector of transistor 165b goes high. With a high input at the B input to XOR gate 170, and a low input at the A input, XOR gate 170 provides a high signal which is fed through diode 172 to switch 70a which causes the field windings 42 of the ac generator to be shorted. As a result, high voltages are not supplied by the ac generator to the load carrying conductors 52, and the operator cannot be severely shocked when plugging in the load to the generator unit.

Once the plug is pushed all the way into the socket and electrical connection is completed, the actuator rod 162 also blocks the light from LED 164a from reaching phototransistor 165a. Now, both transistors 165a and 165b turn off, and the voltage at the A and B inputs into XOR gate go high. As a result, the voltage at the output of the XOR gate goes low. When the XOR gate output is low, switch 70a opens the short in the field windings, and power is supplied by the ac generator to the load. Those skilled in the art will be appreciate that unplugging the load from the ac generator first requires partial removal of the actuator 162 from its housing, with a resulting "Field Off" signal being generated by switch 70a.

Figure 4:
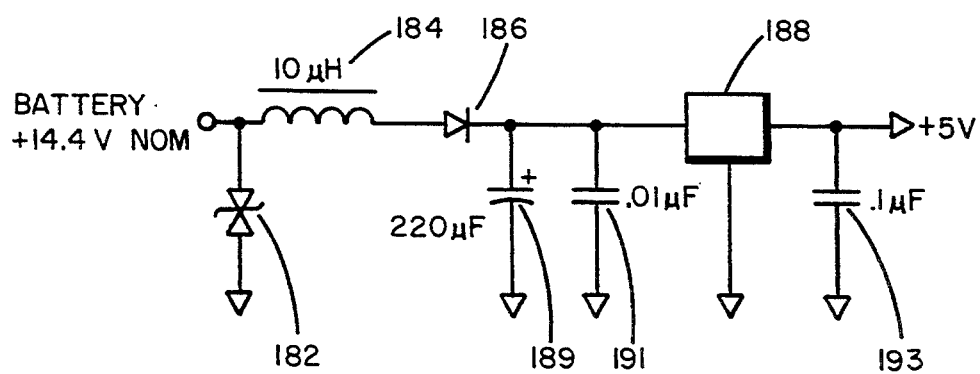
FIG. 4 is a circuit diagram of a 5 V power supply for the protection system circuit and switch interlock of FIGS. 3a and 3b.

Turning to FIG. 4, according to another preferred aspect of the invention, the 5 V source voltage used by the circuitry of FIGS. 3a and 3b is preferably obtained from the motor generator battery. A metal oxide varister 182 is used to clamp spikes in the nominal 14.4 V battery source to ground. The unspiked voltage is then fed through a 10 microhenry inductor 184 a diode 186 to a 5 V voltage regulator 188. The input to the voltage regulator 188 is also coupled to ground via a 220 microfarad capacitor 189 and a 0.01 microfarad capacitor 191 which act as dc filters. The voltage regulator 188 acts to provide a constant 5 V output, even when the battery voltage is reduced by other loads. The 5 V output of the voltage regulator 188 is also filtered by a 0.1 microfarad capacitor 193 before being used as the dc power voltage rail of the circuit breaker circuit.

Figure 2:
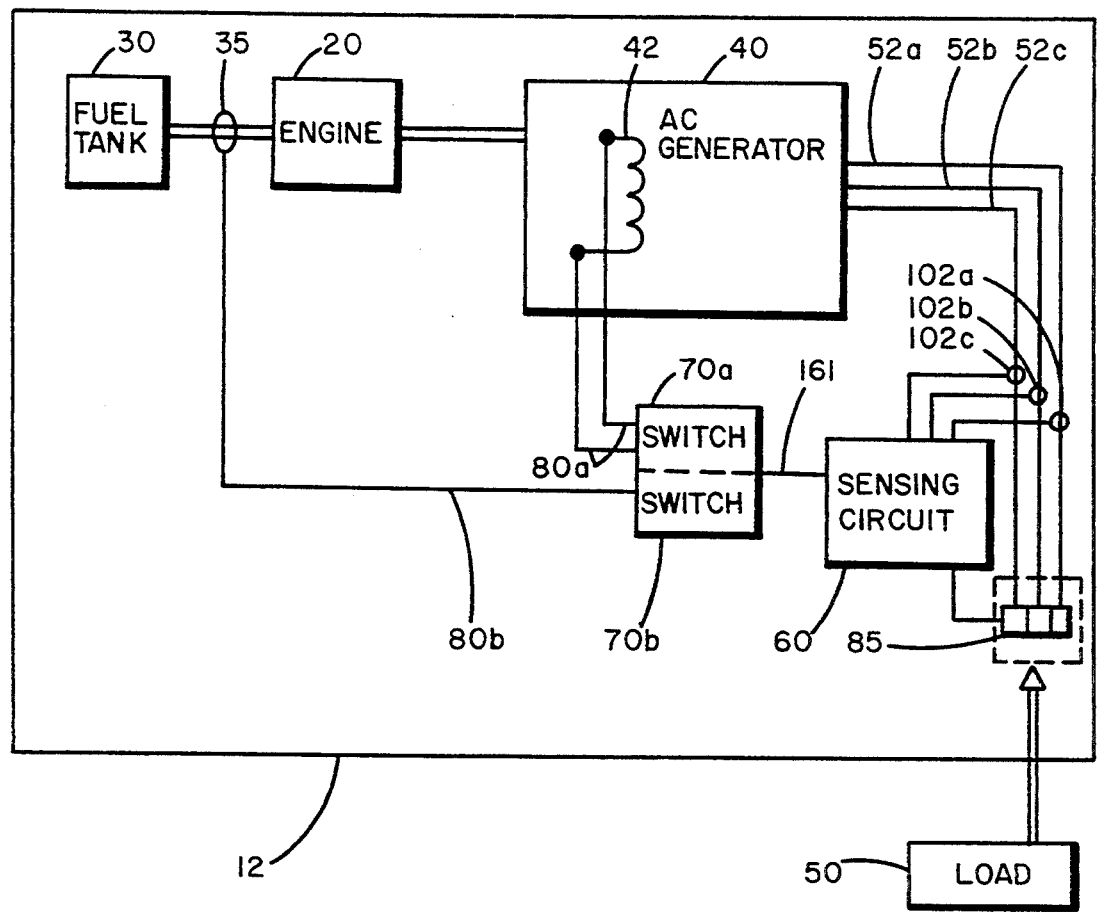
FIG. 2 is a block diagram showing the location of the protection system of the invention in a diesel-engine generator setting.
Figure 5:
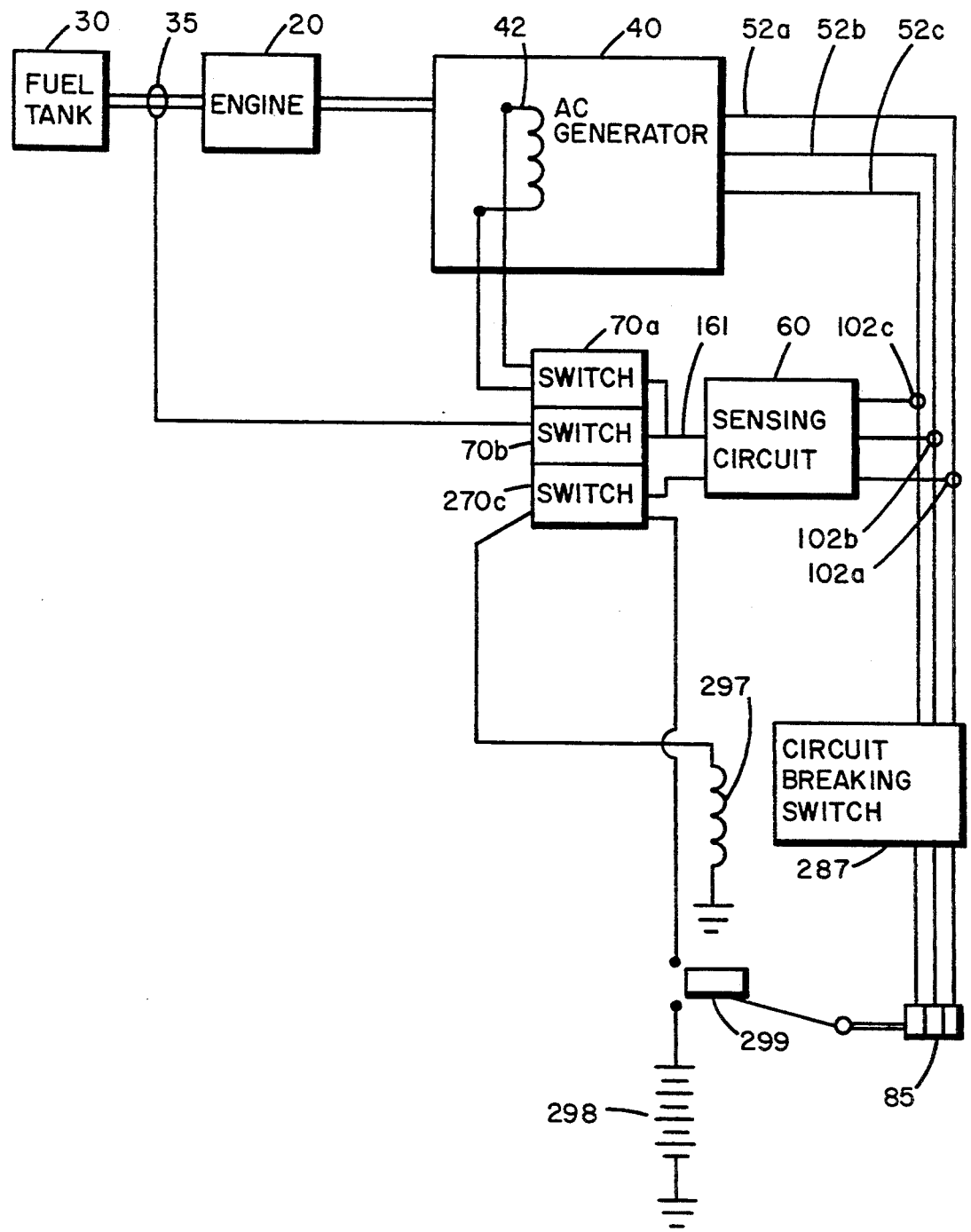
FIG. 5 is a block diagram of an alternate embodiment to FIG. 2 where a circuit breaking switch with manual intervention requirements is used for shock protection.

The protection system of FIG. 5 is essentially the same as that of FIG. 2, except that a manual intervention circuit breaking switch 287 and an additional circuit associated with the manual intervention circuit breaking switch 287 is provided. The additional circuit includes an additional switch 270c and a holding coil 297 which is effectively part of circuit breaking switch 287. Switch 270c is coupled to both the sensing circuit 60 and to the plug socket 85 which includes switch 299, while holding coil 297 is coupled to switch 270c. Holding coil 297 is used to electrically latch a switch in the manual intervention circuit breaking switch 287. With the system of FIG. 5, if an imbalance or overcurrent condition is sensed by sensing circuit 60, not only is the fuel valve solenoid deenergized and the field windings shorted, but switch 270c is opened so that holding coil 297 becomes deenergized. When holding coil 297 is deenergized, the manual intervention circuit breaking switch 287 trips and load lines 52a, 52b, and 52c are effectively disconnected from the socket 85. In order to reassert power to the load, not only must the sensing circuit 60 be reset to close switch 270c and reenergize the holding coil 297, but the manual intervention circuit breaking switch 287 must be manually reset.

The protection system of FIG. 5 has the advantage that the load may be plugged in without interrupting power output of the generator; i.e. without temporarily shorting the field windings or deenergizing the fuel valve solenoid. In particular, the plug of the load is utilized to complete another circuit from power source 298 to switch 270c. When the plug is plugged into socket 85, the 12 V power source 298 energizes the holding coil 297 via switch 270c, provided, of course, the sensing circuit 60 has not opened switch 270c. However, when the plug is not plugged into socket 85, the holding coil 297 is not energized, and the circuit breaking switch 287 remains tripped. Thus, if the load is not plugged into socket 85, in order to provide power to the load, first the load must be plugged in, and then manual intervention circuit breaking switch 287 must be thrown. These two steps do not affect switches 70a and 70b.

It will be appreciated that with the protection system of FIG. 5, the circuitry of FIG. 3b will be changed such that the interlock system can be removed, and the plugging in of the load does not generate a signal on line 161b.

Figure 6A:
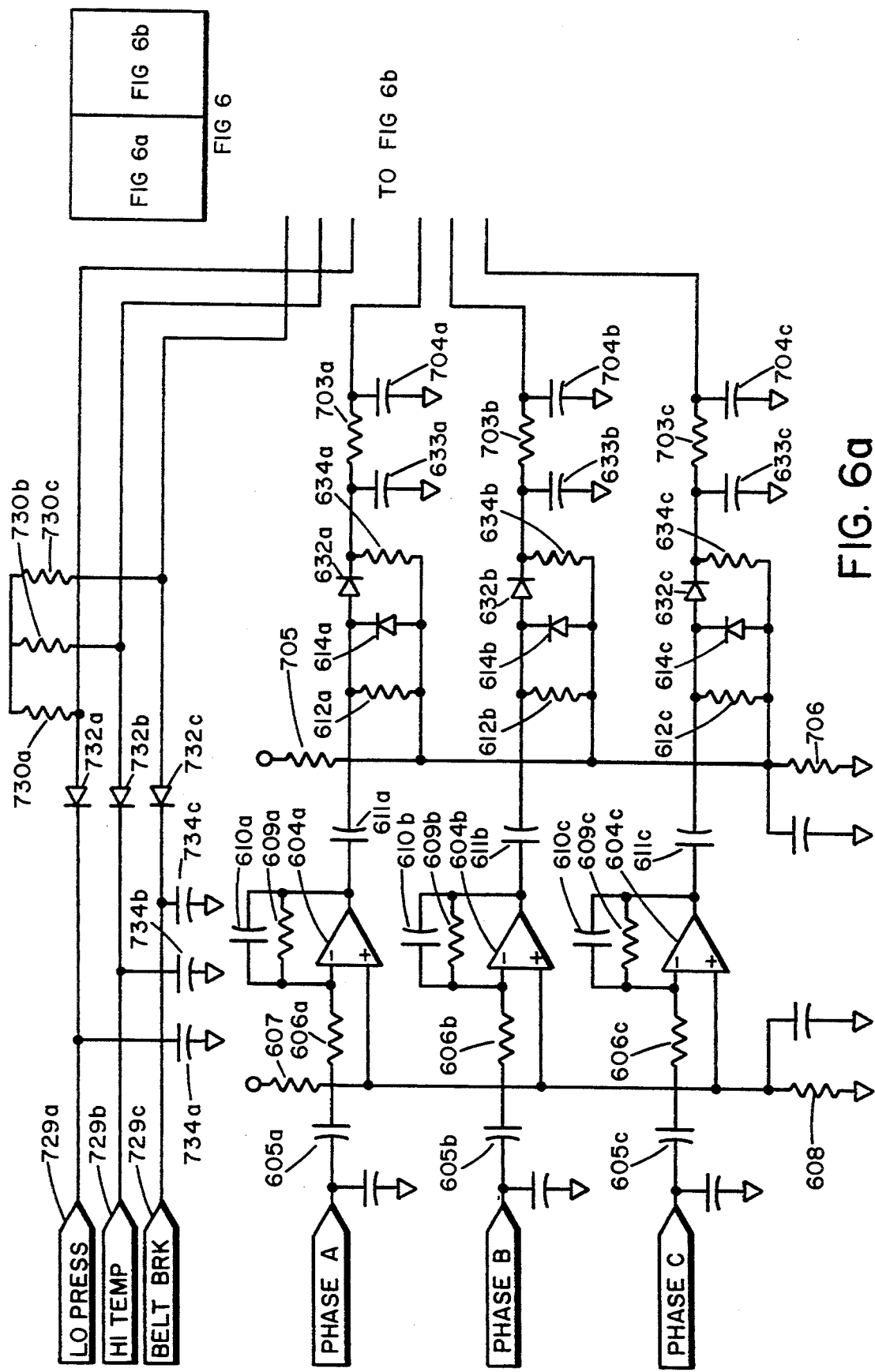
FIGS. 6a and 6b together constitute a circuit diagram of a second embodiment of the protection system circuitry.
Figure 6B:
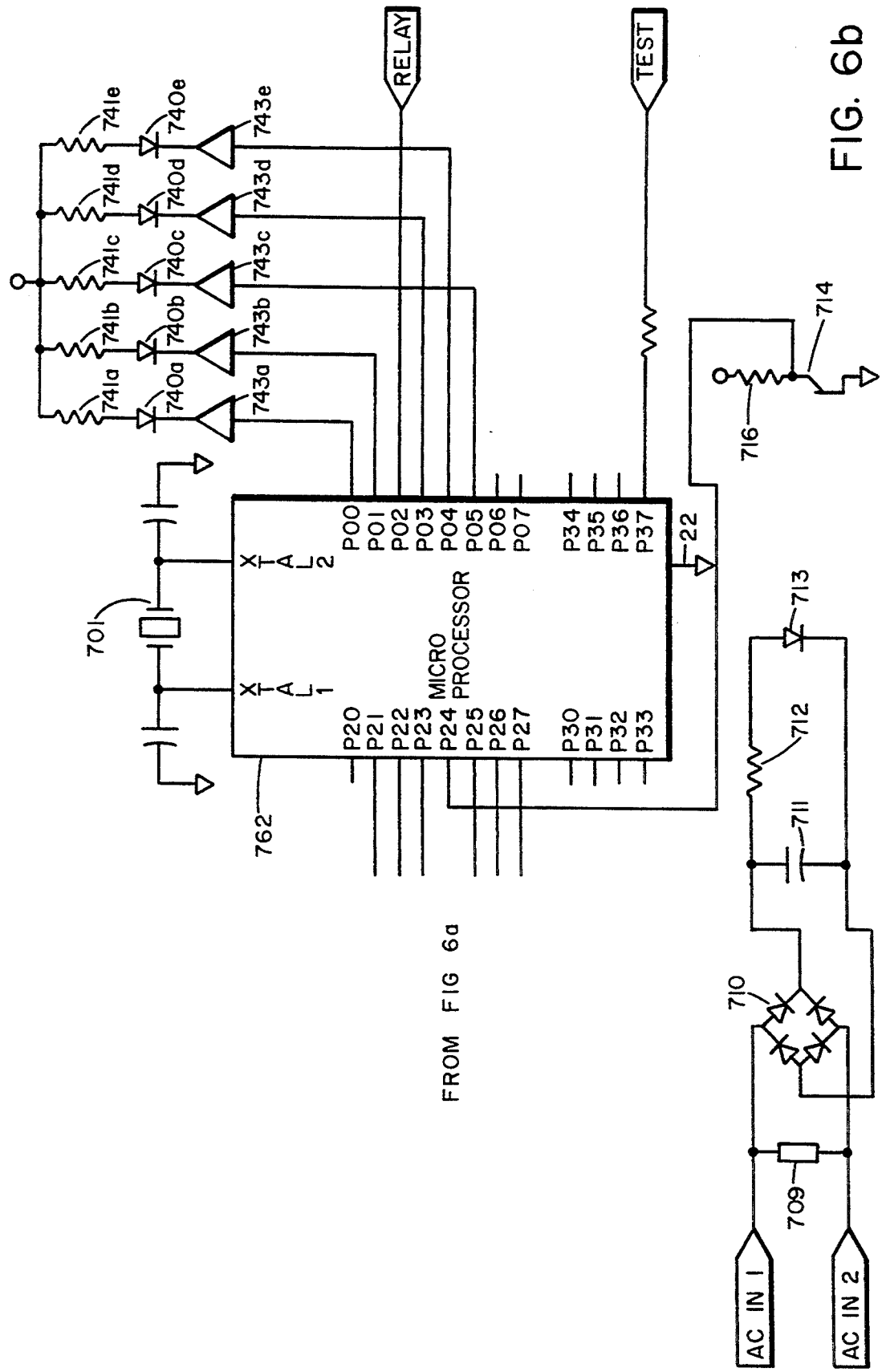

Turning to FIG. 6, a second embodiment of the protection circuit is seen. The protection circuit 560 is in many respects similar to that of circuit 60 seen in FIGS. 3a and 3b, except that the logic circuitry for detecting an overload or an imbalance resides in a microprocessor 702 having accompanying oscillator circuitry 701 rather than in discrete components. In particular, and with like parts in FIG. 6 being represented by values five hundred removed from parts of FIGS. 3a and 3b, the voltage induced in each coupling is fed through circuits having capacitors (605a, 610a, 611a, 617a; 605b, 610b, 611b, 617b; 605c, 610c, 611c, 617c), resistors (607, 608; 606a, 609a, 612a; 606b, 609b. . . ), an amplifier (604a; 604b; 604c), and diodes (614a, 616a; 614b, 632a; 632b, 632c), to generate direct current voltages (V2) representative of the induced voltages. In addition, resistors 634(a,b,c) and capacitors 633(a,b,c) are provided to serve the same function as discussed with reference to the similar resistors and capacitors of FIG. 3a. Each of the direct current voltages is coupled via an RC circuit comprised of a resistor 703(a,b,c) and a capacitor 704(a,b,c) to a respective microprocessor input port (P25, P26, and P27).

In order for the digital microprocessor to read the respective generated voltages, an analog to digital converter must be used. To accomplish this conversion the ports to the microprocessor are cycled repetitively from a momentary low impedance, or output mode to a high impedance, or read mode. This causes the voltages on capacitors 704 (a,b,c) to rapidly reduce to zero at the low impedance and then to charge at the high impedance towards a final value defined by the fixed time constant of resistors 703 (a,b,c) and the phase voltages v2. The microprocessor senses a logic level-"one" an a specific voltage threshold. The microprocessor counts the time it takes for capacitor 704 to charge to the value one threshold level of the microprocessor. The amount of time for the voltage rise is indicative of the generated voltage V2, because the voltage is a function of the voltage V2 as well as the RC time constant. Once the voltage threshold has been passed and the elapsed time is stored, the particular input port is cycled again to the reference level, and the charge on particular capacitor 704 is drained. It will be appreciated that depending on the RC time constant chosen, the direct voltage value may be repetitively sampled over extremely small intervals of time.

The voltage divider resistors 705 and 706 generate a fixed voltage pedestal that is used to bias the capacitors 633 (a,b,c). This places an initial voltage on the capacitors so that the conversion accuracy of the microprocessor is improved.

In accord with the second embodiment of the invention, the microprocessor 702, which is suitably a Z80 microprocessor sold by Intel Corp., compares the voltages for ports P24, P25, and P26 to a predetermined value which is typically stored in memory associated with the microprocessor and which represents a maximum value above which a lead fault is indicated. For example, with the provided circuitry of FIG. 6, thirty-five amps in the lead lines would tranlsate to a generated direct current voltage of approximately 6.9 volts. The amount of time it takes for the 6.9 volts applied via the RC circuit to the input port of the microprocessor to cause the input port to switch from a logic zero to a logic one is then determined and that value stored in memory. The microprocessor 702 then compares the measured elapsed times to the stored value. If any phase exceeds thirty-five amps for eight seconds duration (i.e. it must exceed 35 amperes continuously for eight seconds), a lead fault is declared by raising the output port P02 logic value from zero to one. This causes a relay to, e.g.; trigger the fuel solenoid to shut off the fuel to the engine and/or to short circuit the AC field and/or for the circuit breaking switch to latch, as previously described.

Besides timing the input ports to determine whether the thirty-five amp maximum has been exceeded for the predetermined length of time, the microprocessor 702 preferably sums the generated voltages and divides by eight (by summing the time counts and dividing by eight) in order to provide an interval low voltage reference. The generated dc voltage of each phase is then compared to the low voltage reference by subtracting the measured elapsed times from the determined low voltage reference value. If any of the generated dc voltages is less than the sum divided by eight, a phase imbalance is considered possible. In order to rule out the possibility that the circuit is coupled to a single phase lead where only two of the phases draw much current, the microprocessor also determines whether the amperage drawn is greater than twenty-five amps in any of the phases. This determination is made much in the same manner as the thirty-five amp determination is made, with the microprocessor storing a time value which would be equivalent to the flow twenty-five amps in a phase and with the measured elapsed time values at the ports being compared to this stored time value. If the amperage drawn in any phase is greater than twenty-five amps, and the voltage generated by one of the phases is less than the sum of the generated voltages divided by eight, a phase imbalance is declared, and microprocessor 702 provides a fault output at port P02.

Additional circuitry is found in FIG. 6. A motor sense circuit having two inputs AC IN1 and AC IN2 from the motor includes a spike protector (metal oxide varistor) 709, diode bridge 710, a capacitor 711, resistors 712 and 716, a LED 713, and a light sensitive transistor 714. When the motor is on, the LED 713 turns on, which in turn causes light sensitive transistor 714 to turn on. When light sensitive transistor 714 turns on, the voltage at the collector is pulled down. Since the collector of transistor 714 is coupled to input port P24 of the microprocessor 702, the input port P24, which is otherwise kept high is pulled low, thereby informing the microprocessor that the motor is on.

Additional fault circuitry relating to oil pressure (LOPRES) 729a, engine temperature (HITEMP) 729b, and the fan belt (BELTBRK) 729c is also seen in FIG. 6. Input ports P20, P21, and P22 of the microprocessor are coupled via circuits each having a resistor 730a, 730b, 730c, a diode 732a, 732b, 732c, and a capacitor 734a, 734b, 734c to the oil pressure, engine temperature, and fan belt indicators. Should there be a fault in any of the indicators, the voltage at the respective input port of the microprocessor is pulled to ground (e.g., logic zero). In response, the microprocessor generates the appropriate output. It will be appreciated that in the case of the oil pressure, that before a fault indication is generated, the microprocessor first checks to see that the motor sense circuit indicates that the motor is on. Otherwise, a false alarm could be generated.

The output from the microprocessor 702 may include various LEDs 740a, 740b, 740c, 740d, and 740e which are coupled to various output ports (P00, P01, P03, P04, P05) of the microprocessor and which can be lit based on determination made by the microprocessor. Resistors 741a–741e, and inverters 743a–743e are typically included as part of the output LED circuits.

There have been described and illustrated herein protection systems for ac generators and loads of diesel-engine generator sets. While particular embodiments have been discussed, it should be appreciated by those skilled in the art that it is intended that the invention be broad in scope and that the specifications be read likewise. Thus, for example, while an undesired overcurrent condition was defined in one embodiment as the presence of thirty-five amperes in any one of the phases for a period of five seconds, it will be appreciated that depending on the generator set and load, different currents and time lengths (e.g., three to eight seconds) could be utilized. Similarly, while an undesired imbalance condition (current imbalance) was defined in one embodiment as a phase having less than fifty percent of the average current in the three phases for a period of five seconds, it will be appreciated that other definitions could be utilized. Also, while a three phase ac generator was described, it will be appreciated that the invention applies to any multiphase ac generator. Further, while two particular circuits were set forth for sensing whether overcurrent or imbalance conditions are present, it will be appreciated that other circuitry could be utilized. Also, while two different switch interlocks were described, it will be appreciated that other safety switch interlocks could be utilized.

It will further be appreciated by those skilled in the art that while the preferred embodiment causes the overload or imbalance conditions to both short circuit the field windings and de-energize the fuel valve solenoid, either or both conditions could be used alone to effect either or both results. All that is required is that the signals indicative of a particular condition be wired to a switch or switches which effect the desired results. Similarly, either or both conditions can be used alone or together to cause a circuit breaker to break the line between the ac generator and the load. Further, while one switch interlock was described as causing a temporary shorting of the field windings during electrical connection of the load to the ac generator, it will be appreciated that that switch interlock could de-energize the fuel valve solenoid as well. Therefore, it will be apparent to those skilled in the art that additional modifications can be made to the described invention without deviating from the scope and spirit of the invention as so claimed.

We claim:

1. A system for protecting a multiphase ac generator of a diesel-engine generator set to which a load is electrically coupled, the multiphase ac generator having field windings and a plurality of output load carrying conductors carrying current of different phases, said system being coupled to said output load carrying conductors, wherein a fuel valve solenoid is associated with said diesel-engine generator set, said system comprising:

a) circuit means coupled to said output load carrying conductors for determining the presence of an undesired overcurrent condition where the current in any of said plurality of output load carrying conductors is greater than a predetermined current for a predetermined length of time, said circuit means including means for providing a signal indicative of an undesired condition in response to a determined undesired overcurrent condition;

b) at least one of a means for shorting said field windings and a means for de-energizing said fuel valve solenoid; and c) switch means coupled to said circuit means and coupled to at least one of said means for shorting said field windings and said means for de-energizing said fuel valve solenoid, said switch means for receiving said signal indicative of an undesired condition and for causing said means for shorting to short said field windings and/or for causing said means for de-energizing to de-energize said fuel valve solenoid protecting the ac generator in response to said signal indicative of an undesired condition; and d) switch interlock means coupling said output load carrying conductors to said load, said switch interlock means for preventing an application of voltage from said output load carrying conductors to said load upon initial physical connection of said load to said switch interlock means, and for allowing an application of voltage from said output load carrying conductors to said load upon activation of said switch interlock means, wherein said circuit means comprises a transformer coupling for each of said output load carrying conductors, with the voltage induced in each said transformer coupling being proportional to the current in the respective load carrying conductor, said circuit means further comprises comparator means for comparing voltages related to said voltages induced in each said transformer couplings to predetermined voltages, and for accordingly providing comparator output signals indicative of overcurrent conditions or comparator output signals indicative of permissible current conditions, said comparator means comprises a microprocessor and associated RC circuitry.

2. A system for protecting a multiphase ac generator of a diesel-engine generator set to which a load is electrically coupled, the multiphase ac generator having field windings and a plurality of output load carrying conductors carrying current of different-phases, said system being coupled to said output load carrying conductors, wherein a fuel valve solenoid is associated with said diesel-engine generator set, said system comprising:

a) circuit means coupled to said output load carrying conductors for determining the presence of an undesired overcurrent condition where the current in any of said plurality of output load carrying conductors is greater than a predetermined current for a predetermined length of time, said circuit means including means for providing a signal indicative of an undesired condition in response to a determined undesired overcurrent condition;

b) at least one of a means for shorting said field windings and a means for de-energizing said fuel valve solenoid; and c) switch means coupled to said circuit means and coupled to at least one of said means for shorting said field windings and said means for de-energizing said fuel valve solenoid, said switch means for receiving said signal indicative of an undesired condition and for causing said means for shorting to short said field windings and/or for causing said means for de-energizing to de-energize said fuel valve solenoid protecting the ac generator in response to said signal indicative of an undesired condition; and d) switch interlock means coupling said output load carrying conductors to said load, said switch interlock means for preventing an application of voltage from said output load carrying conductors to said load upon initial physical connection of said load to said switch interlock means, and for allowing an application of voltage from said output load carrying conductors to said load upon activation of said switch interlock means, wherein said circuit means comprises a transformer coupling for each of said output load carrying conductors, with the voltage induced in each said transformer coupling being proportional to the current in the respective load carrying conductor, said circuit means further comprises comparator means for comparing voltages related to said voltages induced in each said transformer couplings to predetermined voltages, and for accordingly providing comparator output signals indicative of overcurrent conditions or comparator output signals indicative of permissible current conditions, said means for providing a signal comprises timing means for finding whether said comparator output signal is indicative of an undesirable overcurrent condition where said overcurrent condition exists for said predetermined length of time, said means for providing a signal providing said signal indicative of an undesired condition in response thereto, and said timing means comprises a microprocessor.

3. A system for protecting a multiphase ac generator of a diesel-engine generator set to which a load is electrically coupled, the multiphase ac generator having field windings and a plurality of output load carrying conductors carrying current of different phases, said system being coupled to said output load carrying conductors, wherein a fuel valve solenoid is associated with said diesel-engine generator set, said system comprising:

a) circuit means coupled to said output load carrying conductors for determining the presence of an undesired overcurrent condition where the current in any of said plurality of output load carrying conductors is greater than a predetermined current for a predetermined length of time, said circuit means including means for providing a signal indicative of an undesired condition in response to a determined undesired overcurrent condition;

b) at least one of a means for shorting said field windings and a means for de-energizing said fuel valve solenoid; and c) switch means coupled to said circuit means and coupled to at least one of said means for shorting said field windings and said means for de-energizing said fuel valve solenoid, said switch means for receiving said signal indicative of an undesired condition and for causing said means for shorting to short said field windings and/or for causing said means for de-energizing to de-energize said fuel valve solenoid protecting the ac generator in response to said signal indicative of an undesired condition; and d) switch interlock means coupling said output load carrying conductors to said load, said switch interlock means for preventing an application of voltage from said output load carrying conductors to said load upon initial physical connection of said load to said switch interlock means, and for allowing an application of voltage from said output load carrying conductors to said load upon activation of said switch interlock means, wherein said circuit means includes imbalance detection means for determining the presence of an undesired imbalance condition where the current in any of said plurality of output load carrying conductors, for a second predetermined length of time, is less than a predetermined function of the currents in all of said output load carrying conductors, said means for providing a signal indicative of an undesired condition providing a signal in response to a determined imbalance condition, said circuit means comprises a transformer coupling for each of said output load carrying conductors, with the voltage induced in each said transformer coupling being proportional to the current in the respective load carrying conductor, and said imbalance detection means comprises summing means for summing voltages related to said voltages induced in each said transformer coupling to provide a summed voltage, and said summing means comprises a microprocessor and associated RC circuitry.

4. A system for protecting a multiphase ac generator of a diesel-engine generator set to which a load is electrically coupled, the multiphase ac generator having field windings and a plurality of output load carrying conductors carrying current of different phases, said system being coupled to said output load carrying conductors, wherein a fuel valve solenoid is associated with said diesel-engine generator set, said system comprising:

a) circuit means coupled to said output load carrying conductors for determining the presence of an undesired overcurrent condition where the current in any of said plurality of output load carrying conductors is greater than a predetermined current for a predetermined length of time, said circuit means including means for providing a signal indicative of an undesired condition in response to a determined undesired overcurrent condition;

b) at least one of a means for shorting said field windings and a means for de-energizing said fuel valve solenoid; and c) switch means coupled to said circuit means and coupled to at least one of said means for shorting said field windings and said means for de-energizing said fuel valve solenoid, said switch means for receiving said signal indicative of an undesired condition and for causing said means for shorting to short said field windings and/or for causing said means for de-energizing to de-energize said fuel valve solenoid protecting the ac generator in response to said signal indicative of an undesired condition; and d) switch interlock means coupling said output load carrying conductors to said load, said switch interlock means for preventing an application of voltage from said output load carrying conductors to said load upon initial physical connection of said load to said switch interlock means, and for allowing an application of voltage from said output load carrying conductors to said load upon activation of said switch interlock means, wherein said circuit means includes imbalance detection means for determining the presence of an undesired imbalance condition where the current in any of said plurality of output load carrying conductors, for a second predetermined length of time, is less than a predetermined function of the currents in all of said output load carrying conductors, said means for providing a signal indicative of an undesired condition providing a signal in response to a determined imbalance condition, and said multiphase ac generator is a three phase ac generator, said plurality of output load carrying conductors comprises three output load carrying conductors, and said predetermined function is one-eighth the sum of said three output load carrying conductors, and said imbalance detection means further comprises means for determining whether any of said three output load carrying conductors is carrying more than twenty-five amperes of current.

5. A system according to claim 4, wherein:

said predetermined current is thirty-five amperes, and said predetermined length of time is between three and eight seconds.

6. A system for protecting a multiphase ac generator of a diesel-engine generator set to which a load is electrically coupled, the multiphase ac generator having field windings and a plurality of output load carrying conductors carrying current of different phases, said system being coupled to said output load carrying conductors, wherein a fuel valve solenoid is associated with said diesel-engine generator set, said system comprising:

a) circuit means coupled to said output load carrying conductors for determining the presence of an undesired overcurrent condition where the current in any of said plurality of output load carrying conductors is greater than a predetermined current for a predetermined length of time, said circuit means including means for providing a signal indicative of an undesired condition in response to a determined undesired overcurrent condition;

b) at least one of a means for shorting said field windings and a means for de-energizing said fuel valve solenoid; and c) switch means coupled to said circuit means and coupled to at least one of said means for shorting said field windings and said means for de-energizing said fuel valve solenoid, said switch means for receiving said signal indicative of an undesired condition and for causing said means for shorting to short said field windings and/or for causing said means for de-energizing to de-energize said fuel valve solenoid protecting the ac generator in response to said signal indicative of an undesired condition; and d) switch interlock means coupling said output load carrying conductors to said load, said switch interlock means for preventing an application of voltage from said output load carrying conductors to said load upon initial physical connection of said load to said switch interlock means, and for allowing an application of voltage from said output load carrying conductors to said load upon activation of said switch interlock means, wherein said switch interlock means includes a circuit breaking switch means coupled in each output load carrying conductor, said circuit breaking switch means being further coupled to said switch means, said switch means causing said circuit breaking switch means to break an electrical path from said output load carrying conductors to said load upon said circuit breaking switch means receiving said signal.

* * * * *